(12) United States Patent
Kim et al.

(10) Patent No.: US 7,973,899 B2
(45) Date of Patent: Jul. 5, 2011

(54) THIN FILM TRANSISTOR ARRAY PANEL WITH CAPACITIVE COUPLING BETWEEN ADJACENT PIXEL AREAS

(75) Inventors: Hyun-Wuk Kim, Yongin-si (KR); Jae-Jin Lyu, Gyeonggi-do (KR); Yoon-Sung Um, Yongin-si (KR); Chang-Hun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/544,871

(22) Filed: Aug. 20, 2009

(65) Prior Publication Data

US 2009/0310074 A1 Dec. 17, 2009

Related U.S. Application Data

(63) Continuation of application No. 11/254,134, filed on Oct. 18, 2005, now abandoned.

(30) Foreign Application Priority Data

Dec. 3, 2004 (KR) .................. 10-2004-0100916

(51) Int. Cl.
G02F 1/1343 (2006.01)
G02F 1/1337 (2006.01)
(52) U.S. Cl. .................. 349/139; 349/146; 349/129
(58) Field of Classification Search .................. 349/139, 349/146, 129
See application file for complete search history.

(56) References Cited

U.S. PATENT DOCUMENTS

| | | | |
|---|---|---|---|
| 5,576,858 A | 11/1996 | Ukai et al. | |
| 5,680,190 A | 10/1997 | Michibayashi et al. | |
| 5,748,276 A | 5/1998 | Uno et al. | |
| 6,078,367 A | 6/2000 | Satou | |
| 6,515,728 B1 | 2/2003 | Song et al. | |
| 6,738,120 B1 | 5/2004 | Song et al. | |
| 6,791,633 B2 | 9/2004 | Matsumoto | |
| 6,850,302 B2* | 2/2005 | Song | 349/129 |
| 6,853,425 B2 | 2/2005 | Kim et al. | |
| 6,922,183 B2 | 7/2005 | Ting et al. | |
| 6,936,845 B2 | 8/2005 | Kim et al. | |
| 6,954,246 B2* | 10/2005 | Kim et al. | 349/129 |
| 7,324,170 B2* | 1/2008 | Baek | 349/38 |
| 7,405,427 B2* | 7/2008 | Lee et al. | 257/59 |
| 7,440,040 B2 | 10/2008 | Kwak et al. | |
| 7,453,086 B2* | 11/2008 | Kim et al. | 257/59 |

(Continued)

FOREIGN PATENT DOCUMENTS

JP 05-333376 12/1993

(Continued)

*Primary Examiner* — Mike Qi (74) *Attorney, Agent, or Firm* — Innovation Counsel LLP (57) ABSTRACT

A thin film transistor array panel according to one embodiment of the invention comprises: first, second, and third pixel electrodes arranged sequentially, the second pixel electrode including first and second sub-pixel electrodes, the second pixel electrode occupying an area comprising a first area and a second area that is disposed closer to the third pixel electrode than the first area; first, second, and third thin film transistors connected to the first, the second, and the third pixel electrodes, respectively; first, second, and third gate lines connected to the first, the second, and the third thin film transistors, respectively; and a data line connected to the first, the second, and the third thin film transistors, wherein the second sub-pixel electrode is capacitively coupled to the third pixel electrode, and the second sub-pixel electrode is present in both the first and the second areas.

12 Claims, 8 Drawing Sheets

U.S. PATENT DOCUMENTS

| | | |
|---|---|---|
| 7,474,363 B2 | 1/2009 | Kim et al. |
| 7,639,333 B2 * | 12/2009 | Do et al. ............... 349/129 |
| 7,705,926 B2 * | 4/2010 | Kim et al. ............... 349/43 |
| 2005/0030460 A1 | 2/2005 | Kim et al. |
| 2005/0036091 A1 | 2/2005 | Song |
| 2005/0140886 A1 | 6/2005 | Kim et al. |
| 2005/0213015 A1 | 9/2005 | Shimoshikiryo |
| 2006/0033871 A1 * | 2/2006 | Kim et al. ............... 349/139 |
| 2006/0061722 A1 | 3/2006 | Jun |
| 2006/0072049 A1 | 4/2006 | Song |
| 2007/0229745 A1 | 10/2007 | Do et al. |
| 2009/0009458 A1 | 1/2009 | Bae et al. |

FOREIGN PATENT DOCUMENTS

| | | |
|---|---|---|
| JP | 07-311390 | 11/1995 |
| JP | 08-160455 | 6/1996 |
| JP | 08-201777 | 8/1996 |
| JP | 2000-019559 | 1/2000 |
| JP | 2001-109018 | 4/2001 |
| JP | 2001-222027 | 8/2001 |
| JP | 2002-258307 | 9/2002 |
| JP | 2003-186451 | 7/2003 |
| JP | 2003-262890 | 9/2003 |
| JP | 2004-062146 | 2/2004 |
| JP | 2004-145270 | 5/2004 |
| KR | 1020030017340 A | 3/2003 |
| KR | 1020030042221 A | 5/2003 |
| KR | 1020030065817 A | 8/2003 |
| KR | 1020030095260 A | 12/2003 |
| KR | 1020040001687 A | 1/2004 |
| KR | 1020040002600 A | 1/2004 |
| KR | 1020040062752 A | 7/2004 |

* cited by examiner

THIN FILM TRANSISTOR ARRAY PANEL WITH CAPACITIVE COUPLING BETWEEN ADJACENT PIXEL AREAS

CROSS-REFERENCE TO RELATED APPLICATIONS

The present application is a continuation of U.S. patent application Ser. No. 11/254,134 filed on Oct. 18, 2005 now abandoned which claims Paris Convention priority of South Korean patent application No. 10-2004-0100916 filed on Dec. 3, 2004, both of which are incorporated herein by reference.

BACKGROUND OF THE INVENTION (a) Field of the Invention

The present invention relates to a thin film transistor array panel, and in particular, to a thin film transistor array panel for a liquid crystal display.

(b) Description of Related Art

A liquid crystal display (LCD) is one of the most widely used flat panel display types. An LCD includes two panels provided with field-generating electrodes such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD further includes a plurality of switching elements connected to the pixel electrodes and a plurality of signal lines such as gate lines and data lines for controlling the switching elements to apply voltages to the pixel electrodes.

In order to improve the image quality, it has been suggested to divide each of the pixel electrodes into two sub-pixel electrodes. The sub-pixel electrodes of the pixel electrode have different voltages due to capacitive coupling with adjacent pixel electrodes.

However, the capacitive coupling may decrease the voltage of one of the sub-pixel electrodes so as to decrease the transmittance and the luminance. In addition, the division into the sub-pixel electrodes having different voltages may cause a crack in a displayed character.

SUMMARY OF THE INVENTION

A thin film transistor array panel according to one embodiment of the present invention includes: first, second, and third pixel electrodes arranged sequentially, the second pixel electrode including first and second sub-pixel electrodes, the second pixel electrode occupying an area comprising a first area and a second area that is disposed closer to the third pixel electrode than the first area; first, second, and third thin film transistors connected to the first, the second, and the third pixel electrodes, respectively; first, second, and third gate lines connected to the first, the second, and the third thin film transistors, respectively; and a data line connected to the first, the second, and the third thin film transistors, wherein the second sub-pixel electrode is capacitively coupled to the third pixel electrode, and the second sub-pixel electrode is present in both the first and the second areas.

The first sub-pixel electrode may be capacitively coupled to the first pixel electrode.

The second sub-pixel electrode may be capacitively coupled to the first pixel electrode.

The second sub-pixel electrode may include a first piece disposed in the first area and a second piece disposed in the second area.

The first sub-pixel electrode may include a third piece disposed in the first area and a fourth piece disposed in the second area.

The first piece may be symmetrical to the second piece and the third piece may be symmetrical to the fourth piece.

The first piece may be symmetrical to the fourth piece and the second piece may be symmetrical to the third piece.

The first piece and the third piece may be separated by a first cutout including an oblique portion which is oblique relative to the data line, and the second piece and the fourth piece may be separated by a second cutout including an oblique portion which is oblique relative to the data line.

Each of the first and the second cutouts may further include a longitudinal portion connected to the oblique portion and substantially parallel to the data line.

Each of the first and the second cutout may have a width of at least about one micron and at most about 50 microns.

Each of the oblique portions may make an angle of 30° to 60° with the data line.

At least one of the first, second, third and fourth pieces may have a chamfered corner.

At least one of the first, second, third and fourth pieces may have a chamfered corner having an oblique edge substantially parallel to the oblique portions of the first and the second cutouts.

The thin film transistor array panel may further include a coupling electrode that is connected to the second sub-pixel electrode and overlaps the third pixel electrode.

The thin film transistor array panel may further include a storage electrode line overlapping the second pixel electrode.

The first sub-pixel electrode and the second sub-pixel electrode may have different areas.

Each of the first and third pixel electrodes may include a first sub-pixel electrode and a second sub-pixel electrode; wherein the thin film transistor array panel may further include fourth, fifth, and sixth thin film transistors connected to the first sub-pixel electrodes of the first, the second, and the third pixel electrodes, respectively, and the first, the second, and the third thin film transistors may be connected to the second sub-pixel electrodes of the first, the second, and the third pixel electrodes, respectively.

The first area and the second area may be located on opposite sides of the second gate line.

A thin film transistor array panel according to another embodiment of the invention includes first, second, and third pixel electrodes arranged sequentially, the second pixel electrode occupying an area comprising a first area and a second area that is disposed closer to the third pixel electrode than the first area; first, second, and third thin film transistors connected to the first, the second, and the third pixel electrodes, respectively; first, second, and third gate lines connected to the first, the second, and the third thin film transistors, respectively; a first data line connected to the first, the second, and the third thin film transistors; and a second data line separated from the first data line by the first, the second, and the third pixel electrodes, wherein the second pixel electrode includes a first plurality of pieces disposed in the first area and a second plurality of pieces disposed in the second area, at least one piece of the first plurality is connected to at least one piece of the second plurality, wherein at least one piece of the second plurality is capacitively coupled to the third pixel electrode.

At least one piece of the first plurality and at least one piece of the second plurality may be adjacent to both the first and the second data lines.

BRIEF DESCRIPTION OF THE DRAWINGS

The present invention is illustrated below by a detailed description of embodiments thereof with reference to the accompanying drawing, of which.

DETAILED DESCRIPTION OF EMBODIMENTS

Some embodiments of the present invention will now be described with reference to the accompanying drawings. This invention may, however, be embodied in many different forms and should not be construed as limited to the embodiments set forth herein. Like numerals refer to like elements throughout.

In the drawings, the thickness of layers and regions is exaggerated for clarity. It will be understood that when an element such as a layer, a region or a substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1, 2, 3 and 4.

Figure 1:
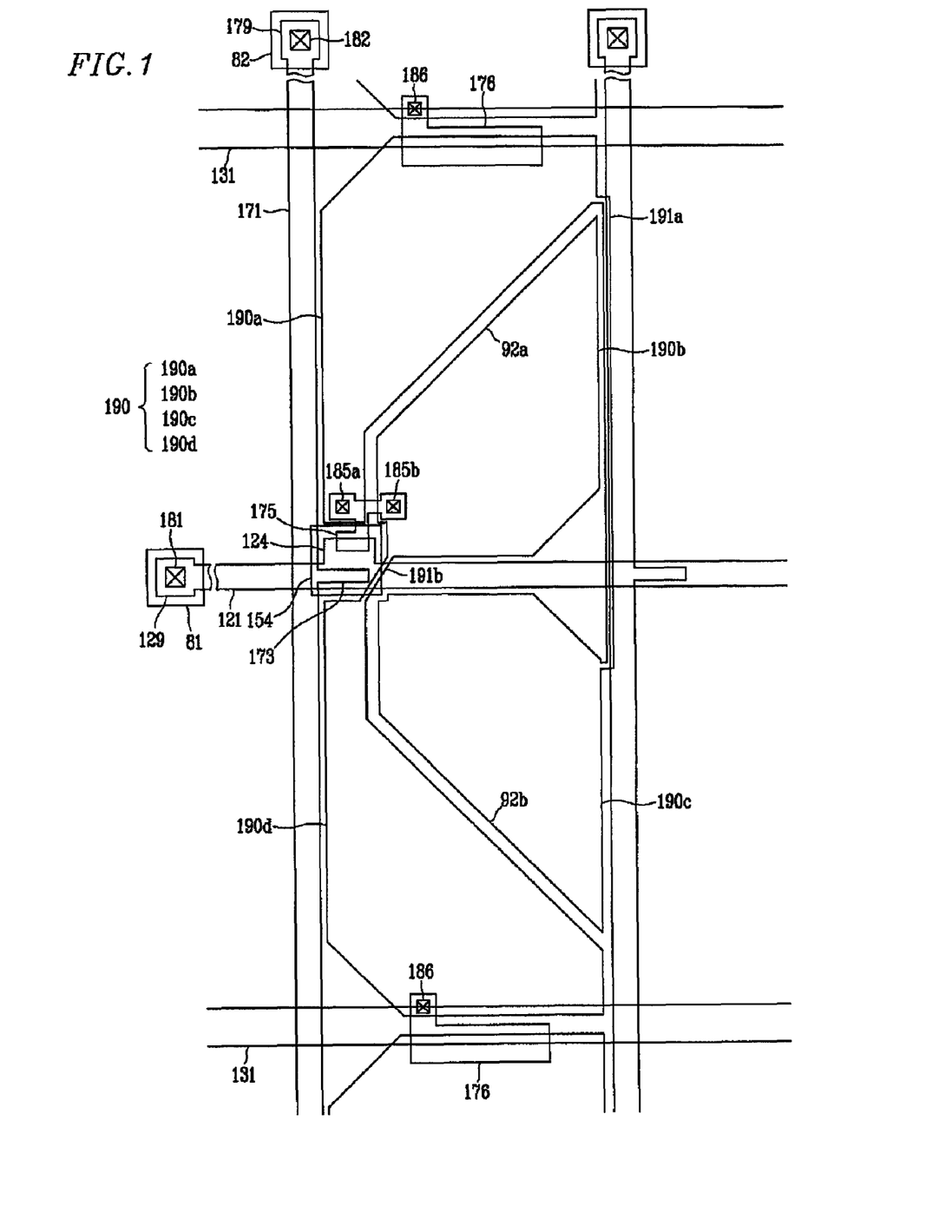
FIG. 1 is a layout view of a TFT array panel for an LCD according to an embodiment of the present invention.
Figure 2:
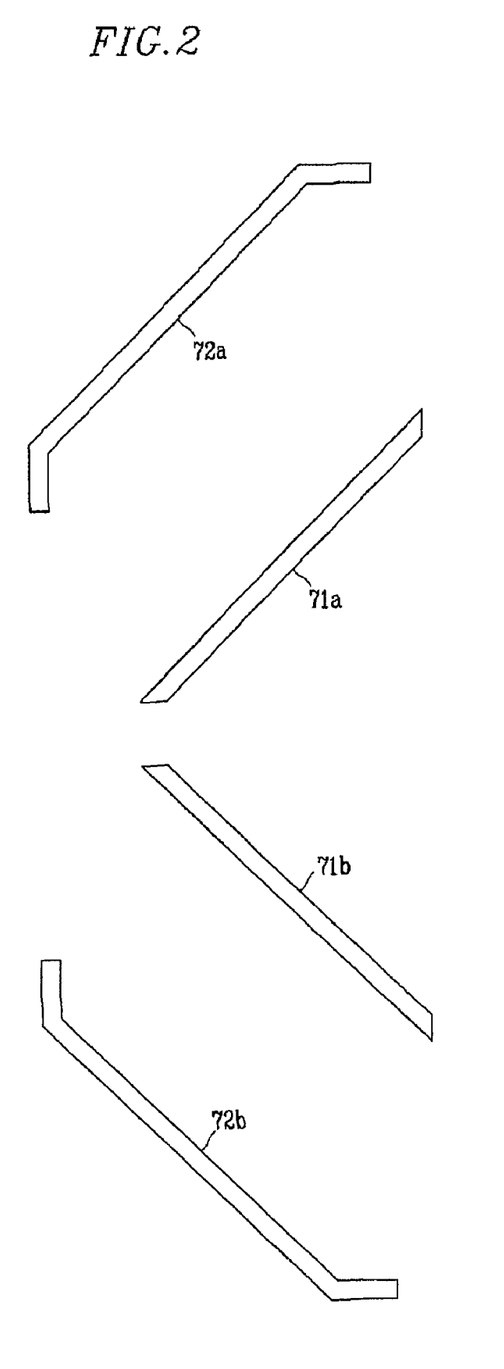
FIG. 2 is a layout view of a common electrode panel for an LCD according to an embodiment of the present invention.
Figure 3:
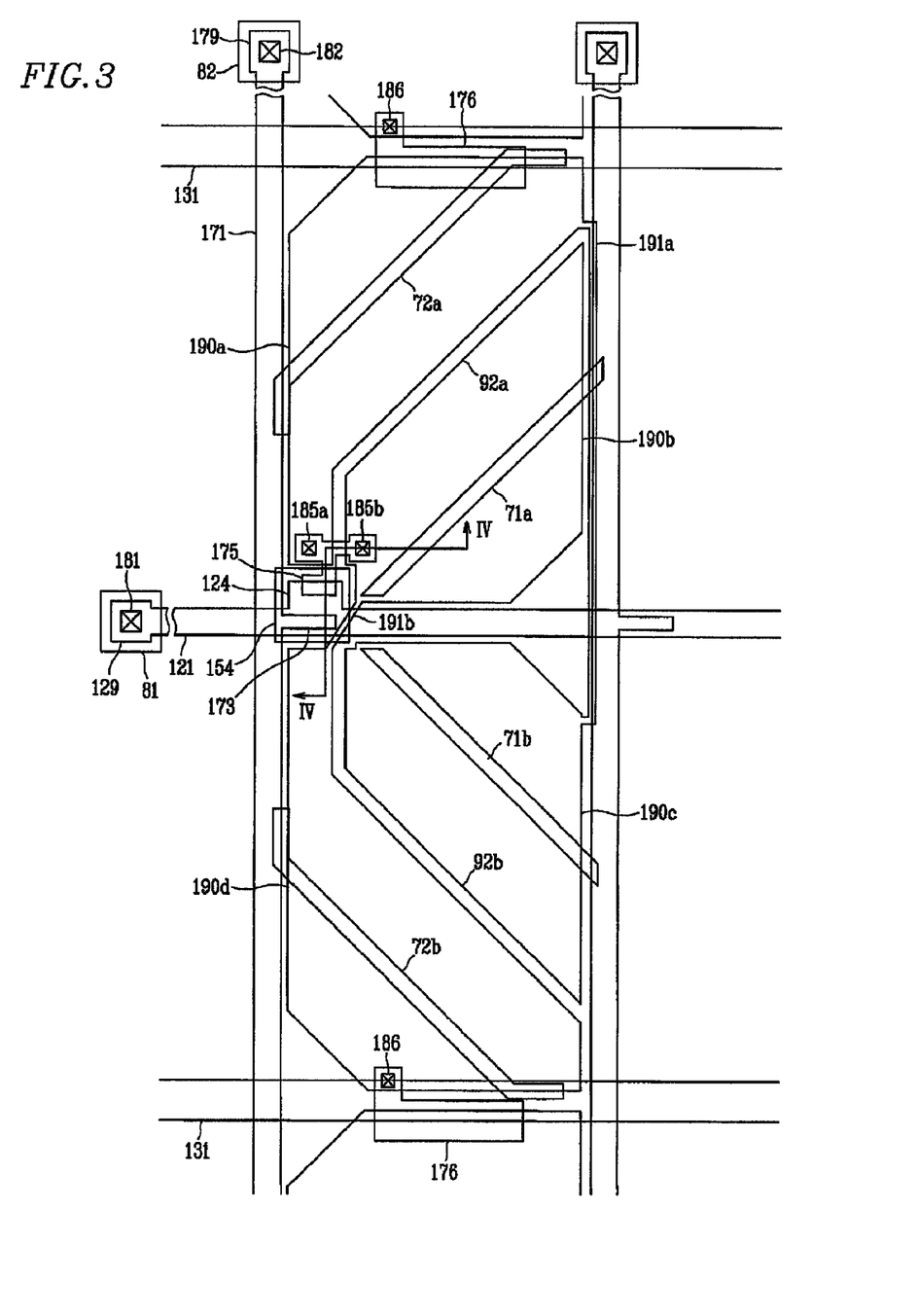
FIG. 3 is a layout view showing the TFT array panel of FIG. 1 and the common electrode panel of FIG. 2.
Figure 4:
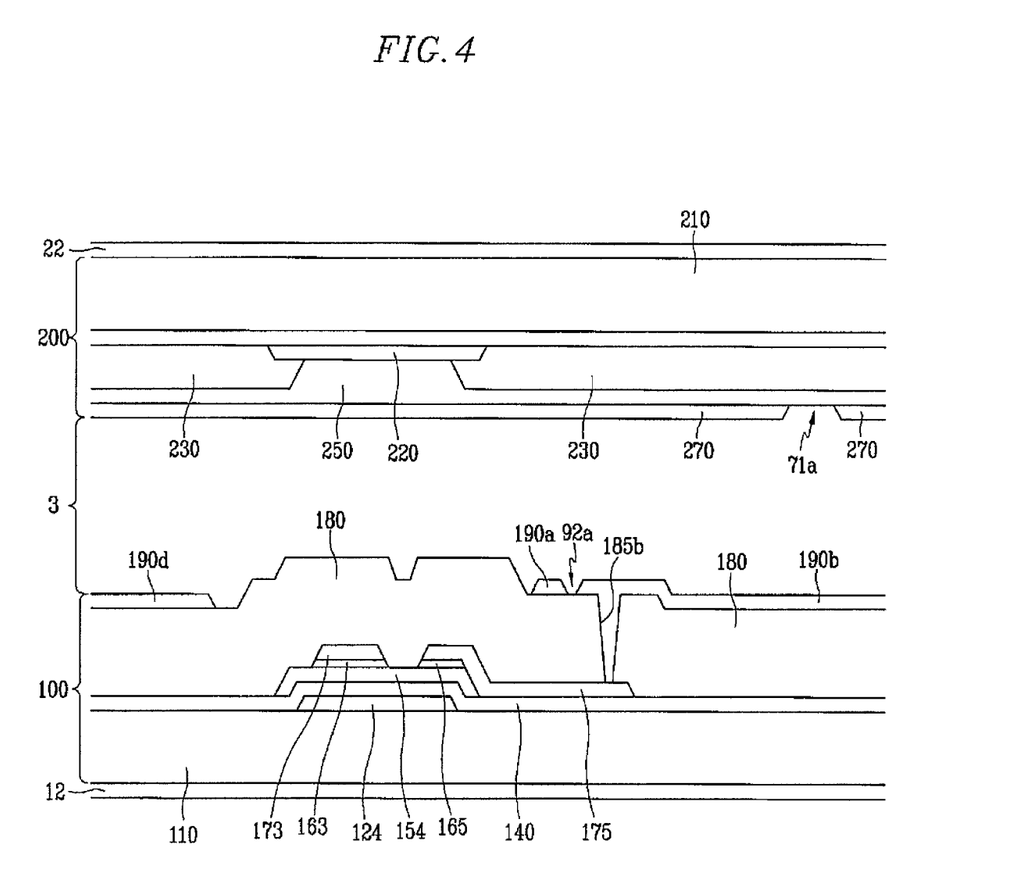
FIG. 4 is a sectional view of the LCD shown in FIG. 3 taken along a line IV-IV.

FIG. 1 is a layout view of a TFT array panel for the LCD, FIG. 2 is a layout view of a common electrode panel for the LCD, FIG. 3 is a layout view showing the TFT array panel of FIG. 1 and the common electrode panel of FIG. 2, and FIG. 4 is a sectional view of the LCD shown in FIG. 3 taken along the line IV-IV.

Referring to FIGS. 1-4, the LCD includes a TFT array panel 100, a common electrode panel 200 facing the TFT array panel 100, and a liquid crystal layer 3 interposed between the panels 100 and 200.

First, the TFT array panel 100 will be described with reference to FIGS. 1, 3 and 4.

A plurality of gate lines 121 and a plurality of storage electrode lines 131 are formed on an insulating substrate 110 such as transparent glass or plastic.

The gate lines 121 transmit gate signals and extend substantially in a transverse direction. Each of the gate lines 121 includes a plurality of gate electrodes 124 projecting upward (in the view of FIGS. 1, 3), and widened end portion 129 for contact with another layer or an external driving circuit. A gate driving circuit (not shown) for generating the gate signals may be mounted on a flexible printed circuit (FPC) film (not shown), which may be attached to the substrate 110. The gate driving circuit may also be directly mounted on the substrate 110, or integrated onto the substrate 110. The gate lines 121 may extend to, and be connected to, a driving circuit that may be integrated on the substrate 110.

The storage electrode lines 131 are held at a predetermined voltage. The storage electrode lines 131 extend substantially parallel to the gate lines 121. Each of the storage electrode lines 131 is disposed between two adjacent gate lines 121 and it is nearly equidistant from the two gate lines 121. However, this positioning is not limiting, and the storage electrode lines 131 may have other shapes and arrangements.

The gate lines 121 and the storage electrode lines 131 are preferably made of a metal or a composition of metals. These lines can be made of any one or more of aluminum (Al), gold (Au), copper (Cu), molybdenum (Mo), chromium (Cr), tantalum (Ta), or titanium (Ti). These metals and their alloys are preferred but not limiting. The gate lines 121 and the storage electrode lines 131 can be made of a multi-layer structure including two conductive films (not shown) having different physical characteristics. One of the two films is preferably made of a low resistivity metal or metal composition including possibly aluminum, gold, and/or copper, for reducing signal delays and/or voltage drops. The other film is preferably made of a material including, or consisting of, molybdenum, chromium, tantalum, or titanium. This material should preferably have good physical and chemical characteristics, and provide a good electrical contact, when used with other materials such as indium tin oxide (ITO) or indium zinc oxide (IZO). Good examples of two-layer structures include (i) a lower film of chromium and an upper film of aluminum or aluminum alloy, or (ii) a lower film of aluminum or aluminum alloy and an upper film of molybdenum or its alloy. However, the gate lines 121 and the storage electrode lines 131 may be made of other metals and other conductive materials.

The lateral sides of the gate lines 121 and the storage electrode lines 131 are inclined (sloped) relative to a surface of the substrate 110, and the inclination angle ranges from about 30 to about 80 degrees.

A gate insulating layer 140 preferably made of silicon nitride (SiNx) or silicon oxide (SiOx) is formed on the gate lines 121 and the storage electrode lines 131.

A plurality of semiconductor islands 154 preferably made of hydrogenated amorphous silicon ("a-Si") or polysilicon are formed on the gate insulating layer 140. Each of the semiconductor islands 154 is disposed on a gate electrode 124.

A plurality of pairs of ohmic contact islands 163 and 165 are formed on the semiconductor stripes 154. The ohmic contacts 163 and 165 are preferably made of n+ hydrogenated a-Si heavily doped with n type impurity such as phosphorous or they may be made of silicide.

The lateral sides of the semiconductor islands 154 and the ohmic contacts 163 and 165 are inclined relative to the surface of the substrate 110, and the inclination angles thereof are preferably in a range of about 30 to about 80 degrees.

A plurality of data lines 171, a plurality of drain electrodes 175, and a plurality of coupling electrodes 176 are formed on the ohmic contacts 163 and 165 and the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124 and a widened end portion 179 for contact with another layer or an external driving circuit. A data driving circuit (not shown) for generating the data signals may be mounted on a FPC film (not shown), which may be attached to the substrate 110. The data driving circuit can also be directly mounted on the substrate 110, or integrated onto the substrate 110. The data lines 171 may extend to, and be connected to, a driving circuit that may be integrated on the substrate 110.

The drain electrodes 175 are separated from the data lines 171 and disposed opposite the source electrodes 173 with respect to the gate electrodes 124. Each of the drain electrodes 175 includes an end portion disposed on an ohmic contact 165 and another end portion bifurcated into two branches.

A gate electrode 124, a source electrode 173, and a drain electrode 175 along with a semiconductor island 154 form a TFT having a channel in the semiconductor island 154 between the source electrode 173 and the drain electrode 175.

The coupling electrodes 176 cross over, and overlap, the storage electrodes lines 131.

The data lines 171, the drain electrodes 175, and the coupling electrodes 176 are preferably made of a refractory metal such as Cr, Mo, Ta, Ti, or alloys thereof. Alternatively, these lines and electrodes may have a multi-layer structure including a refractory metal film (not shown) and a low resistivity film (not shown). A good multi-layer example is a double-layer structure including a lower film consisting of Cr and/or Mo or their alloys, and an upper film of Al or its alloy. Another good example is a triple-layer structure having a lower film of Mo or its alloy, a middle film of Al or its alloy, and an upper film of Mo or its alloy. The data lines 171, the drain electrodes 175, and the coupling electrodes 176 may also be made of various other metals and other conductive materials.

The data lines 171, the drain electrodes 175, and the coupling electrodes 176 have inclined edge profiles, with the inclination angles ranging from about 30 to about 80 degrees.

The ohmic contacts 163 and 165 are provided only between the semiconductor islands 154 and the overlying conductors 171 and 175 to reduce the contact resistance therebetween. The semiconductor islands 154 include exposed portions, not covered by the data lines 171 and the drain electrodes 175. Such portions include areas between the source electrodes 173 and the drain electrodes 175.

A passivation layer 180 is formed on the data lines 171, the drain electrodes 175, the coupling electrodes 176, and the exposed portions of the semiconductor islands 154. The passivation layer 180 is preferably made of an inorganic or organic insulator and it may have a flat top surface. Suitable inorganic insulators include silicon nitride and silicon oxide. The organic insulator may be photosensitive and may have a dielectric constant less than about 4.0. The passivation layer 180 may include a lower film of an inorganic insulator and an upper film of an organic insulator to provide the excellent insulating characteristics of the organic insulator while preventing the organic insulator from damaging the semiconductor islands 154.

The passivation layer 180 has a plurality of contact holes 182 exposing the end portions 179 of the data lines 171, a plurality of contact holes 185a and 185b exposing the bifurcated branches of the drain electrodes 175, and a plurality of contact holes 186 exposing the coupling electrodes 176. The passivation layer 180 and the gate insulating layer 140 have a plurality of contact holes 181 exposing the end portions 129 of the gate lines 121.

A plurality of pixel electrodes 190 and a plurality of widened contact plates 81 and 82 are formed on the passivation layer 180. They are preferably made of a transparent conductive material such as ITO or IZO, or a reflective conductive material such as Ag, Al, Cr, or their alloys.

Each pixel electrode 190 is located between two respective data lines 171. Each pixel electrode 190 is approximately a rectangle that has four main edges nearly parallel to the gate lines 121 or the data lines 171 respectively. Each pixel electrode 190 is bisected into upper and lower halves by a gate line 121, and is symmetric with respect to the gate line 121. The first piece 190a is symmetric to the fourth piece 190d, and second piece 190b is symmetric to the third piece 190c.

The upper half of the pixel electrode 190 has a chamfered upper left corner and a chamfered lower right corner (in the view of FIGS. 1, 3). The chamfered corners form oblique edges making an angle of about 45 degrees with the gate lines 121. Similarly, the lower half of the pixel electrode 190 has a chamfered upper right corner and a chamfered lower left corner that form oblique edges substantially perpendicular to the oblique edges of the upper half.

Each of the upper and the lower halves is partitioned into two pieces, i.e., first and second pieces 190a and 190b or third and fourth pieces 190c and 190d, by a cutout 92a or 92b. Each cutout 92a, 92b has an oblique portion extending approximately from the right edge of the pixel electrode 190 toward the left edge of the pixel electrode 190 and a longitudinal portion extending from the respective oblique portion to the gate line 121. The oblique portion of the cutout 92a is substantially parallel to the oblique edges of the upper half of the pixel electrode 190, and the oblique portion of the cutout 92b is substantially parallel to the oblique edges of the lower half of the pixel electrode 190. This is not necessary, however. Also, the oblique portions may make any angles from one to 89 degrees with the data lines 171 (from 30° to 60° in some embodiments). The longitudinal portions of the cutouts 92a and 92b form a single straight line. Each cutout 92a, 92b may have a width from about 1 micron to about 50 microns inclusive.

The first piece 190a of the pixel electrode 190 is connected to a drain electrode 175 through a contact hole 185a and overlaps a storage electrode line 131 and a coupling electrode 176. The second piece 190b is connected to the drain electrode 175 through a contact hole 185b. The fourth piece 190d of the pixel electrode 190 overlaps a storage electrode line 131 which is connected to a coupling electrode 176 through a contact hole 186. Each of the first and fourth pieces 190a, 190d is disposed adjacent to each of the respective adjacent data lines 171. The first and the third pieces 190a, 190c are connected to each other by a first connection 191a extending along a data line 171 to form a first sub-pixel electrode, while the second and the fourth pieces 190b, 190d are connected to each other by a second connection 191b crossing over the gate line 121 to form a second sub-pixel electrode. Due to the symmetry of pieces 190a, 190d and of pieces 190b, 190c as noted above, the first and the second sub-pixel electrodes have equal areas.

Each of the sub-pixel electrodes of a pixel electrode 190 is capacitively coupled to the sub-pixel electrodes of adjacent pixel electrodes 190. More particularly, the first sub-pixel electrode of an instant pixel electrode 190 is capacitively coupled to the second sub-pixel electrode of the upper pixel electrode 190, and the second sub-pixel electrode of the instant pixel electrode 190 is capacitively coupled to the first sub-pixel electrode of the lower pixel electrode.

The number of a pixel electrode's partitions and pieces may vary depending on the design factors such as the pixel size, the length to width ratio of the pixel electrode 190, the type and characteristics of the liquid crystal layer 3, and so on.

The first and the second sub-pixel electrodes, when supplied with data voltages, generate electric fields in cooperation with a common electrode 270 of the common electrode panel 200 supplied with a common voltage. The electric fields determine the orientations of liquid crystal molecules of the liquid crystal layer 3 disposed between the electrodes 190 on one hand and the electrode 270 on the other hand. The first sub-pixel electrode of electrode 190 and the common electrode 270 form a first liquid crystal capacitor. The second sub-pixel electrode of electrode 190 and the common electrode 270 form a second liquid crystal capacitor. The first and second liquid crystal capacitors store applied voltages after the TFT turns off.

The sub-pixel electrodes overlap storage electrode lines 131 adjacent thereto. The first sub-pixel electrode of electrode 190 and its adjacent storage electrode line 131 form a first storage capacitor. The second sub-pixel electrode of electrode 190 and its adjacent storage electrode line 131 form a second storage capacitor. The first and second storage capacitors enhance the voltage storing capability of the liquid crystal capacitors.

The first and the second sub-pixel electrodes of a pixel electrode 190 may be at different voltages since they are capacitively coupled to the sub-pixel electrodes of other pixel electrodes 190. More particularly, for a given ("instant") pixel electrode 190, when its first LC capacitor ("instant first LC capacitor") has been charged, the voltage of its second sub-pixel electrode ("instant second sub-pixel electrode") can change during the charging of the first sub-pixel electrode of the adjacent "lower" pixel electrode 190 ("lower" in the view of FIG. 1). The sub-pixel electrodes and other elements of the lower pixel electrode 190 will be designated as "lower" (e.g. "lower second sub-pixel electrode"). The voltage of the instant second sub-pixel electrode decreases or increases with the voltage of the lower first sub-pixel electrode. The voltage change of the instant second sub-pixel electrode depends on the voltage change of the lower first sub-pixel electrode and on the capacitances of the instant second LC capacitor, the instant storage capacitor, and the coupling capacitor formed by the instant second sub-pixel electrode and the lower first sub-pixel electrode.

In particular, the voltage across the instant second LC capacitor can be smaller than the voltage across the instant first LC capacitor under dot or row inversion. For example, suppose the instant second sub-pixel electrode is charged with a positive-polarity voltage. Then the lower first sub-pixel electrode, which is capacitively coupled to the instant second sub-pixel electrode, is driven to a negative-polarity voltage. The voltage of the lower first sub-pixel electrode therefore decreases to the negative-polarity voltage value, and consequently the voltage across the instant second LC capacitor decreases. Similarly, when the instant second sub-pixel electrode is charged with a negative-polarity voltage, the voltage of the lower first sub-pixel electrode is increased to a positive-polarity value, and thus the voltage across the instant second LC capacitor decreases.

We assume that the instant second sub-pixel electrode is capacitively coupled to the lower first sub-pixel electrode, the two sub-pixel electrodes forming a "coupling capacitor." Suppose further that the charging of the instant pixel electrode is followed by the charging of the lower pixel electrode. The voltage change $\Delta V2$ of the instant second sub-pixel electrode due to the coupling capacitor is given by:

$$\Delta V2 = (V2f - V2i) =$$
$$\frac{Cpp}{Clcb + Cstb + Cpp}\Delta V3 = \frac{Cpp}{Clcb + Cstb + Cpp}(V3a - V3s),$$

where

Clcb and Cstb are the capacitances of the instant second LC capacitor and the instant second storage capacitor which include the instant second sub-pixel electrode, Cpp is the capacitance of the coupling capacitor, $\Delta V3$ is the voltage change of the lower first sub-pixel electrode, V2i and V2f are the initial and final voltages of the instant second sub-pixel electrode, respectively, V3a is the voltage applied to the lower first sub-pixel electrode, and V3s is the previous voltage of the lower first sub-pixel electrode. Of note, the initial voltage V2i of the instant second sub-pixel electrode is equal to the voltage V1 of the instant first sub-pixel electrode.

Suppose that the instant pixel electrode and the lower pixel electrode represent the same color (e.g. the same shade of gray) for two successive frames and the dot inversion or line inversion (row inversion) is employed. Then, V3a=−V1 and V3s=+V1.

The above equation yields:

$$V2f = V2i + \frac{Cpp}{Clcb + Cstb + Cpp}(V3a - V3s)$$
$$= V1 + \frac{Cpp}{Clcb + Cstb + Cpp}(-V1 - V1)$$
$$= \left(1 - \frac{2Cpp}{Clcb + Cstb + Cpp}\right)V1$$
$$= \frac{Clcb + Cstb - Cpp}{Clcb + Cstb + Cpp}V1$$
$$= TV1.$$

Accordingly, the final voltage V2f of the instant second sub-pixel electrode is smaller than the voltage V1 of the instant first sub-pixel electrode. The ratio T=V2f/V1 is preferably equal to about 0.65-0.95.

Similar analysis is valid for the instant and the upper pixel electrode capacitances.

The contact plates 81 and 82 are provided at the end portions 129 of the gate lines 121 and the end portions 179 of the data lines 171 at the contact holes 181 and 182, respectively. The contact plates 81 and 82 protect the end portions 129 and 179 and enhance the adhesion between the end portions 129 and 179 and contacts to external devices.

Now the common electrode panel 200 will be described with reference to FIGS. 2-4.

A light blocking member 220 referred to as a black matrix for preventing light leakage is formed on an insulating substrate 210 such as transparent glass or plastic. The light blocking member 220 has a plurality of openings that face the pixel electrodes 190 and it may have substantially the same planar shape as the pixel electrodes 190. The light blocking member 220 may also include a plurality of rectilinear portions facing the data lines 171 on the TFT array panel 100 and a plurality of widened portions facing the TFTs on the TFT array panel 100.

A plurality of color filters 230 are also formed on the substrate 210. The color filters 230 are disposed substantially in the areas enclosed by the light blocking member 220. The color filters 230 may extend substantially in the longitudinal direction along the pixel electrodes 190. Each color filter 230 may represent one of the primary colors such as red, green or blue.

An overcoat 250 is formed on the color filters 230 and the light blocking member 220. The overcoat 250 is preferably made of (organic) insulator. The overcoat 250 protects the color filters 230 from exposure and provides a flat surface. The overcoat 250 may be omitted.

The common electrode 270 is formed on the overcoat 250. The common electrode 270 is preferably made of transparent conductive material such as ITO or IZO. The common electrode 270 has a plurality of sets of cutouts, each set consisting of upper cutouts 71a, 72a and lower cutouts 71b, 72b.

In each set, the cutouts 71a-72b face a pixel electrode 190. Each of the cutouts 71a-72b is disposed between a cutout 92a or 92b and a chamfered edge of the pixel electrode 190. Each of the cutouts 71a-72b has at least an oblique portion extending substantially parallel to the upper cutout 92a or the lower cutout 92b of the pixel electrode 190. The cutouts 71a-72b have substantially an inversion symmetry with respect to the gate lines 121.

Each of the upper and lower cutouts 71a and 71b extends approximately from the left edge of the pixel electrode 190 approximately to the upper or lower edge, respectively, of the pixel electrode 190.

Each of the upper and lower cutouts 72a and 72b includes an oblique portion, a transverse portion, and a longitudinal portion. The oblique portion extends approximately from the left edge of the pixel electrode 190 approximately to the upper or lower edge of the pixel electrode 190. Each of the transverse and the longitudinal portions extends from the respective end of the oblique portion along an edge of the pixel electrode 190, overlapping the edge of the pixel electrode 190, and making an obtuse angle with the oblique portion.

The number of the cutouts 71a-72b may vary depending on the design factors. Also, the light blocking member 220 may overlap the cutouts 71a-72b to block the light leakage through the cutouts 71a-72b.

Possibly homeotropic alignment layers (not shown) are formed on inner surfaces of the panels 100 and 200. Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film, and the panels 100 and 200.

Preferably, the LC layer 3 has negative dielectric anisotropy and it is subjected to a vertical alignment with the LC molecules in the LC layer 3 aligned such that their long axes are substantially perpendicular to the surfaces of the panels 100 and 200 in the absence of an electric field. Accordingly, incident light cannot pass through the crossed polarization system 12 and 22.

Upon application of the common voltage to the common electrode 270 and a data voltage to a pixel electrode 190, an electric field substantially perpendicular to the surfaces of the panels 100 and 200 is generated. The pixel electrode 190 and the common electrode 270 are referred to as "field generating electrodes" hereinafter. The LC molecules tend to change their orientations in response to the electric field such that their long axes become perpendicular to the field.

The cutouts 92a-92b and 71a-72b of the field generating electrodes 190 and 270 and the edges of the pixel electrodes 190 distort the electric field, causing the field to have a horizontal component that is substantially perpendicular to the edges of the cutouts 92a-92b and 71a-72b and the edges of the pixel electrodes 190.

Referring to FIG. 3, a set of the cutouts 71a-72b and 92a-92b divides a pixel electrode 190 into a plurality of sub-areas. Each sub-area has two primary edges making oblique angles with the major edges of the pixel electrode 190. Since most LC molecules on each sub-area tilt perpendicularly to the primary edges, the azimuthal distribution of the tilt directions is localized to four directions, thereby increasing the reference viewing angle of the LCD.

Of note, the tilt angle of the LC molecules depends on the strength of the electric field. Since the voltages of the first and the second sub-pixel electrodes are different from each other, the tilt angle of the LC molecules on one of the sub-pixel electrode is different from that on the other of the sub-pixel electrodes and thus the luminances on the sub-pixel electrodes are different. Accordingly, while maintaining the average luminance on the two sub-pixel electrodes in a target luminance range, the voltages of the sub-pixel electrodes can be adjusted so that the image viewed from a lateral side would be as near as possible to the image viewed from the front, thereby improving the lateral visibility.

In addition, since each of the first and the second sub-pixel electrodes is distributed to both the lower and the upper halves of the pixel electrode 190 instead of being disposed entirely in the lower or upper half, the different voltages applied to the first and the second sub-pixel electrodes will not generate cracks in characters.

The shapes and the arrangements of the cutouts 71a-72b and 92a-92b may be modified.

At least one of the cutouts 71a-72b and 92a-92b can be replaced with protrusions (not shown) or depressions (not shown). The protrusions are preferably made of organic or inorganic material and disposed on or under the field generating electrodes 190 or 270.

An LCD according to another embodiment of the present invention will now be described in detail with reference to FIGS. 5, 6, 7 and 8.

Figure 5:
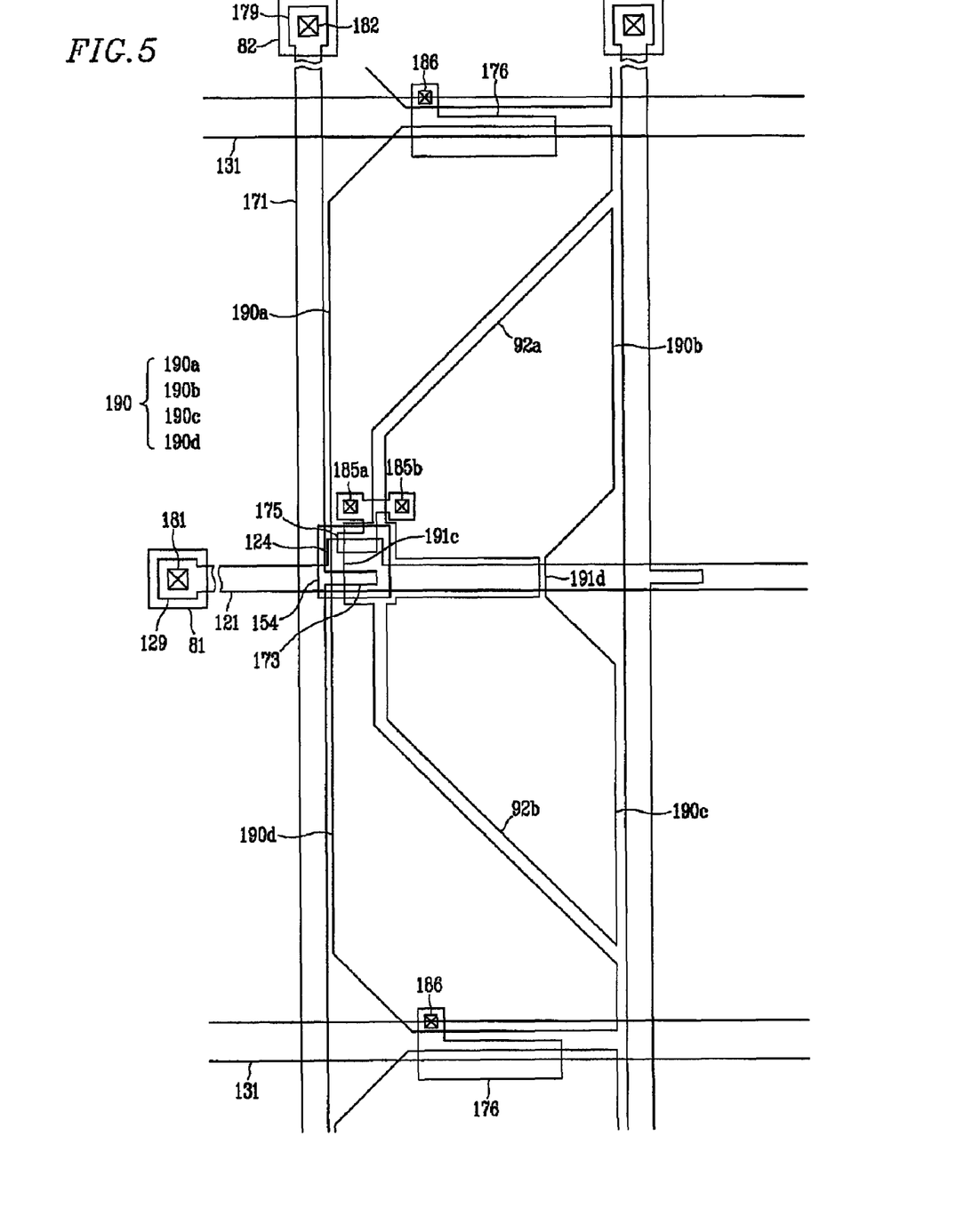
FIG. 5 is a layout view of a TFT array panel for an LCD according to another embodiment of the present invention.
Figure 6:
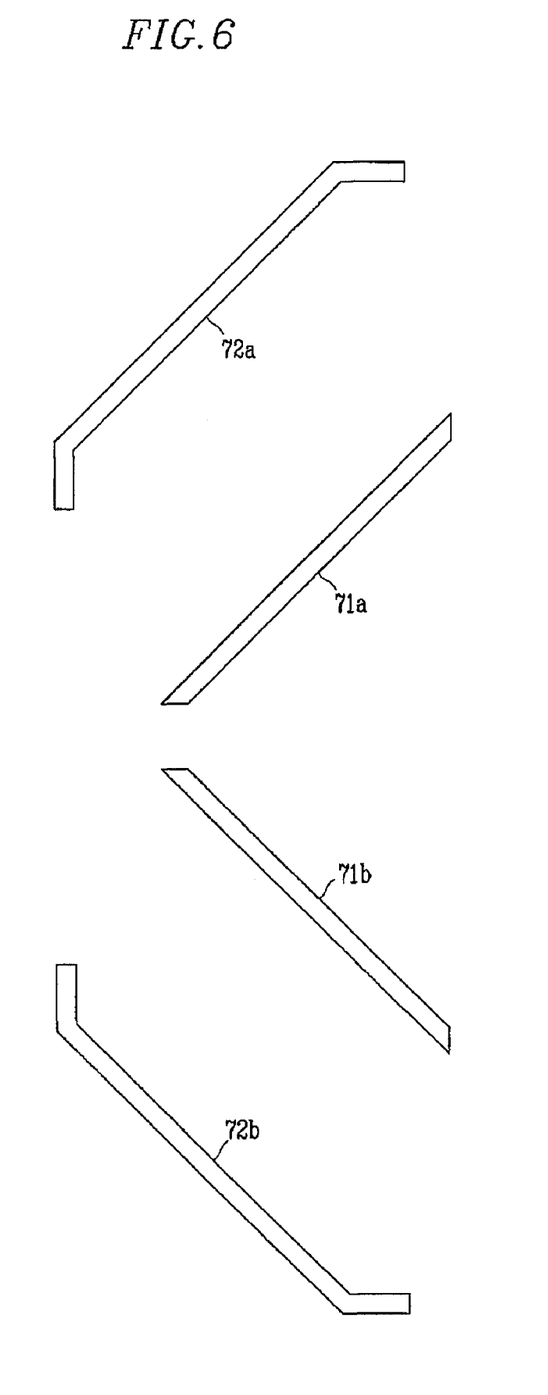
FIG. 6 is a layout view of a common electrode panel for an LCD according to another embodiment of the present invention.
Figure 7:
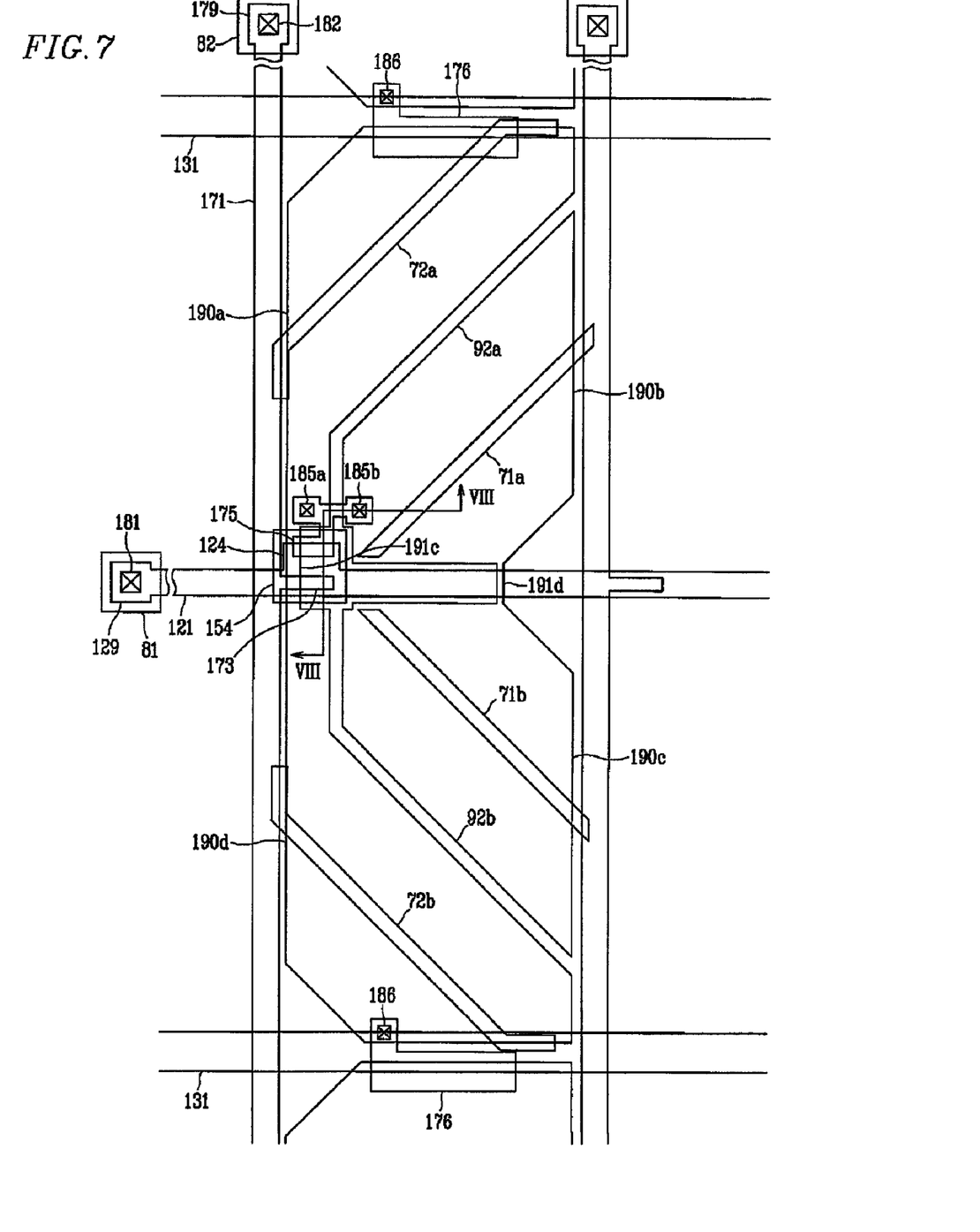
FIG. 7 is a layout view showing the TFT array panel of FIG. 5 and the common electrode panel of FIG. 6.
Figure 8:
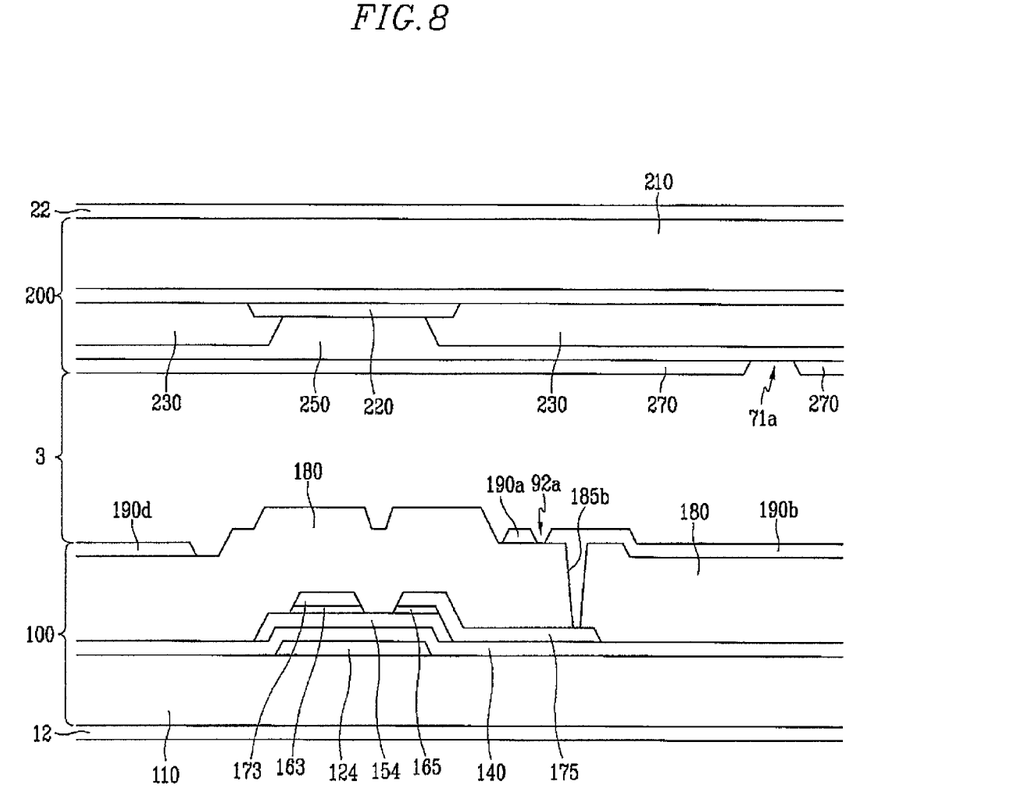
FIG. 8 is a sectional view of the LCD shown in FIG. 7 taken along a line VIII-VIII.

FIG. 5 is a layout view of a TFT array panel for an LCD according to that other embodiment of the present invention, FIG. 6 is a layout view of a common electrode panel for an LCD according to that other embodiment of the present invention, FIG. 7 is a layout view of an LCD including the TFT array panel shown in FIG. 5 and the common electrode panel shown in FIG. 6, and FIG. 8 is a sectional view of the LCD shown in FIG. 7 taken along line VIII-VIII.

Referring to FIGS. 5-8, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

In the TFT array panel 100, a plurality of gate lines 121 including gate electrodes 124 and end portions 129 and a plurality of storage electrode lines 131 are formed on a substrate 110. A gate insulating layer 140, a plurality of semiconductor features 154, and a plurality of ohmic contacts 163 and 165 are sequentially formed on the gate lines 121 and the storage electrode lines 131. A plurality of data lines 171 including source electrodes 173 and end portions 179, a plurality of drain electrodes 175, and a plurality of coupling electrodes 176 are formed on the ohmic contacts 163 and 165. A passivation layer 180 is formed on the data lines 171, the drain electrodes 175, the coupling electrodes 176, and exposed portions of the semiconductor features 154. A plurality of contact holes 181, 182, 185a, 185b and 186 are provided in the passivation layer 180 and the gate insulating layer 140. A plurality of pixel electrodes 190, each including four pieces 190a, 190b, 190c and 190d and having cutouts 92a and 92b, and a plurality of contact plates 81 and 82 are formed on the passivation layer 180.

In the common electrode panel 200, a light blocking member 220, a plurality of color filters 230, an overcoat 250, and a common electrode 270 having cutouts 71a-72b are formed on an insulating substrate 210.

Unlike the LCD shown in FIGS. 1-4, the first and the fourth pieces 190a and 190d of each pixel electrode 190 of the LCD of FIGS. 5-8 are connected to each other by a first connection 191c to form a first sub-pixel electrode, and the second and the third pieces 190b and 190c of each pixel electrode 190 are connected to each other by a second connection 191d to form a second sub-pixel electrode. The pieces 190a, 190b are symmetric to respective pieces 190d, 190c with respect to the gate line 121. The first piece 190a of an instant pixel electrode is capacitively coupled to the fourth piece 190d of the upper pixel electrode, so the instant first sub-pixel electrode is capacitively coupled to the upper and the lower first sub-pixel electrodes.

In some embodiments, the area of the first piece 190a may be different from the area of the second pieces 190b, and consequently (due to the symmetry) the area of the fourth piece 190d may be different from the area of the third piece 190c. The area of the first sub-pixel electrode may be different from the area of the second sub-pixel electrode. Alternatively, the two sub-pixel electrodes may have equal areas.

In this configuration, each of the first and the second sub-pixel electrodes is present both in the lower and the upper halves of the corresponding pixel electrode 190 and both in left and right portions of the pixel electrode instead of being disposed entirely in the lower or upper half or the left or right portion. Therefore, the different voltages applied to the first and the second sub-pixel electrodes will not generate cracks in characters.

In the above-described embodiments, the sub-pixel electrodes of a pixel electrode 190 may be connected to different drain electrodes 175, i.e., to different TFTs that are connected to the same gate line and the same data line. In addition, the number of pieces of a pixel electrode 190, the number of sub-pixel electrodes, the shapes and the areas of the pieces and sub-pixel electrodes, and other parameters may vary.

Although preferred embodiments in accordance with the present disclosure of invention have been described in detail hereinabove, it should be clearly understood that many variations and/or modifications of the basic inventive concepts taught herein fall within the scope of the present teachings.

What is claimed is:

1. A thin film transistor array panel comprising:
a first gate line extending in a first direction on the array panel;
a first data line;
a first thin film transistor of a corresponding first pixel area (PA1) connected to the first gate line and to the first data line, the first pixel area (PA1) being subdivided into an upper first pixel area portion (PA1U) and a lower first pixel area portion (PA1L) by the first gate line;
a first sub pixel electrode piece of the first pixel area (PA1) and a second sub pixel electrode piece of the first pixel area (PA1), said first and second PA1 sub pixel electrode pieces being electrically connected to the first thin film transistor;
a first storage electrode line extending parallel to the first gate line and disposed to overlap the upper first pixel area portion (PA1U);
a second storage electrode line extending parallel to the first gate line and disposed to overlap the lower first pixel area portion (PA1L);
a first coupling electrode overlapping the first storage electrode line; and
a second coupling electrode overlapping the second storage electrode line,
wherein the first sub pixel electrode piece of the first pixel area (PA1) is overlapped by the first coupling electrode.

2. The thin film transistor array panel of claim 1, wherein:
the first pixel area (PA1) further includes a third sub pixel electrode piece and a fourth sub pixel electrode piece both of which are also electrically connected to the first thin film transistor; and
the fourth sub pixel electrode piece of the first pixel area (PA1) is electrically connected to the second coupling electrode.

3. The thin film transistor array panel of claim 1, and further comprising:
a second gate line extending in the first direction on the array panel;
a second thin film transistor of a corresponding second pixel area (PA2) connected to the second gate line and to the first data line, the second pixel area (PA2) being subdivided into an upper second pixel area portion (PA2U) and a lower second pixel area portion (PA2L) by the second gate line;
the second pixel area (PA2) having a corresponding first sub pixel electrode piece of the second pixel area (PA2) disposed in the upper second pixel area portion (PA2U) and electrically connected to the second thin film transistor,
wherein the PA2 first sub pixel electrode piece is overlapped by the second coupling electrode.

4. The thin film transistor array panel of claim 1, wherein:
the first pixel area (PA1) further includes a third sub pixel electrode piece and a fourth sub pixel electrode piece both of which are also electrically connected to the first thin film transistor;
the first and second sub pixel electrode pieces of PA1 are disposed in the upper first pixel area portion (PA1U); and
the third and fourth sub pixel electrode pieces of PA1 are disposed in the lower first pixel area portion (PA1L).

5. The thin film transistor array panel of claim 4 wherein:
the first sub pixel electrode piece of PA1 is disposed adjacent to the first data line while the second sub pixel electrode piece of PA1 is disposed farther away from the first data line; and
the fourth sub pixel electrode piece of PA1 is disposed adjacent to the first data line while the third sub pixel electrode piece of PA1 is disposed farther away from the first data line.

6. The thin film transistor array panel of claim 5, wherein at least one of the sub pixel electrode pieces in the upper first pixel area portion (PA1U) is mirror symmetrical with another of the sub pixel electrode pieces in the lower first pixel area portion (PA1L).

7. The thin film transistor array panel of claim 6 wherein two of the sub pixel electrode pieces in the upper first pixel area portion (PA1U) are mirror symmetrical with a corresponding other two of the sub pixel electrode pieces in the lower first pixel area portion (PA1L) and the first gate line defines the line of said mirror symmetry.

8. The thin film transistor array panel of claim 1, wherein the upper first pixel area portion (PA1U) includes plural sub pixel electrode pieces;

two of the sub pixel electrode pieces of the upper first pixel area portion (PA1U) are spaced apart from one another by a gap extending therebetween and the gap has an oblique portion with respect to the first gate line.

9. The thin film transistor array panel of claim 8, wherein the gap has a width of at least about one micron and at most about 50 microns.

10. The thin film transistor array panel of claim 8, wherein the oblique portion makes an angle of 30° to 60° with the first data line.

11. The thin film transistor array panel of claim 1, wherein at least one of the first sub pixel electrode piece and the second sub pixel electrode piece has a chamfered edge.

12. The thin film transistor array panel of claim 1, wherein at least one sub pixel electrode piece of the first pixel area (PA1) is capacitively coupled to an adjacent sub pixel electrode piece disposed in a second pixel area (PA2) of the array panel where the capacitive coupling is provided by one of the first and second coupling electrodes.

\* \* \* \* \*